Patented Feb. 28, 1933

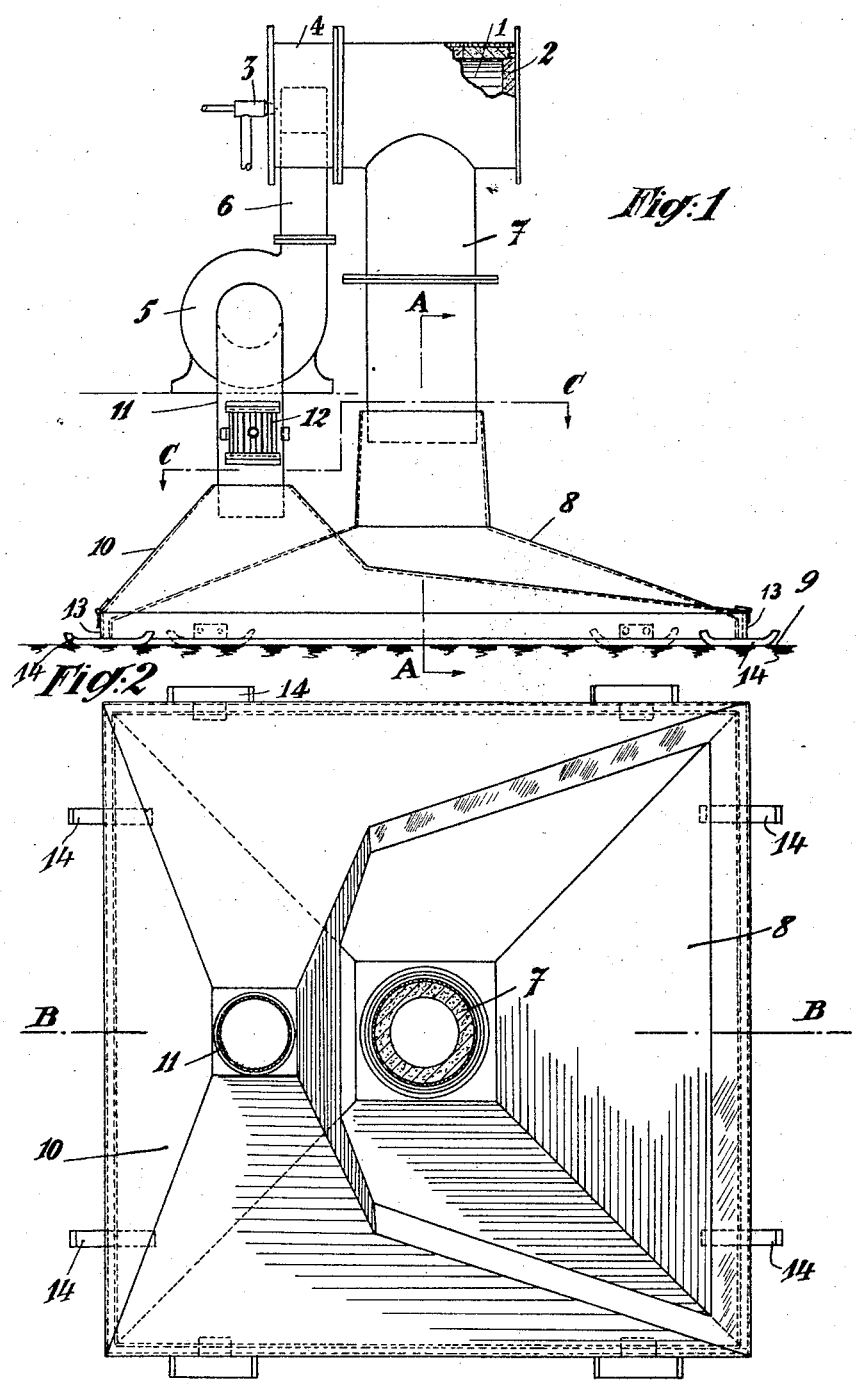

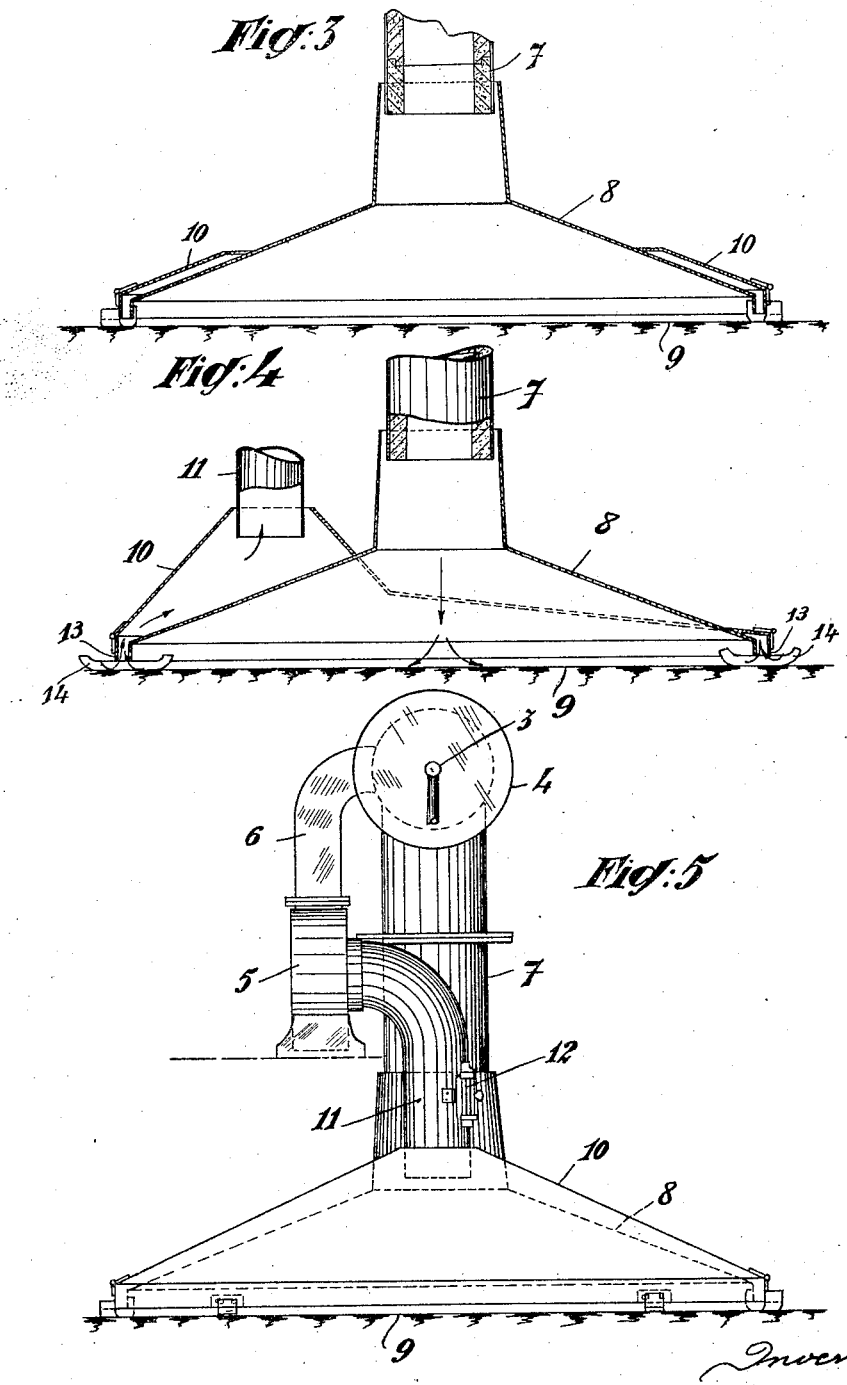

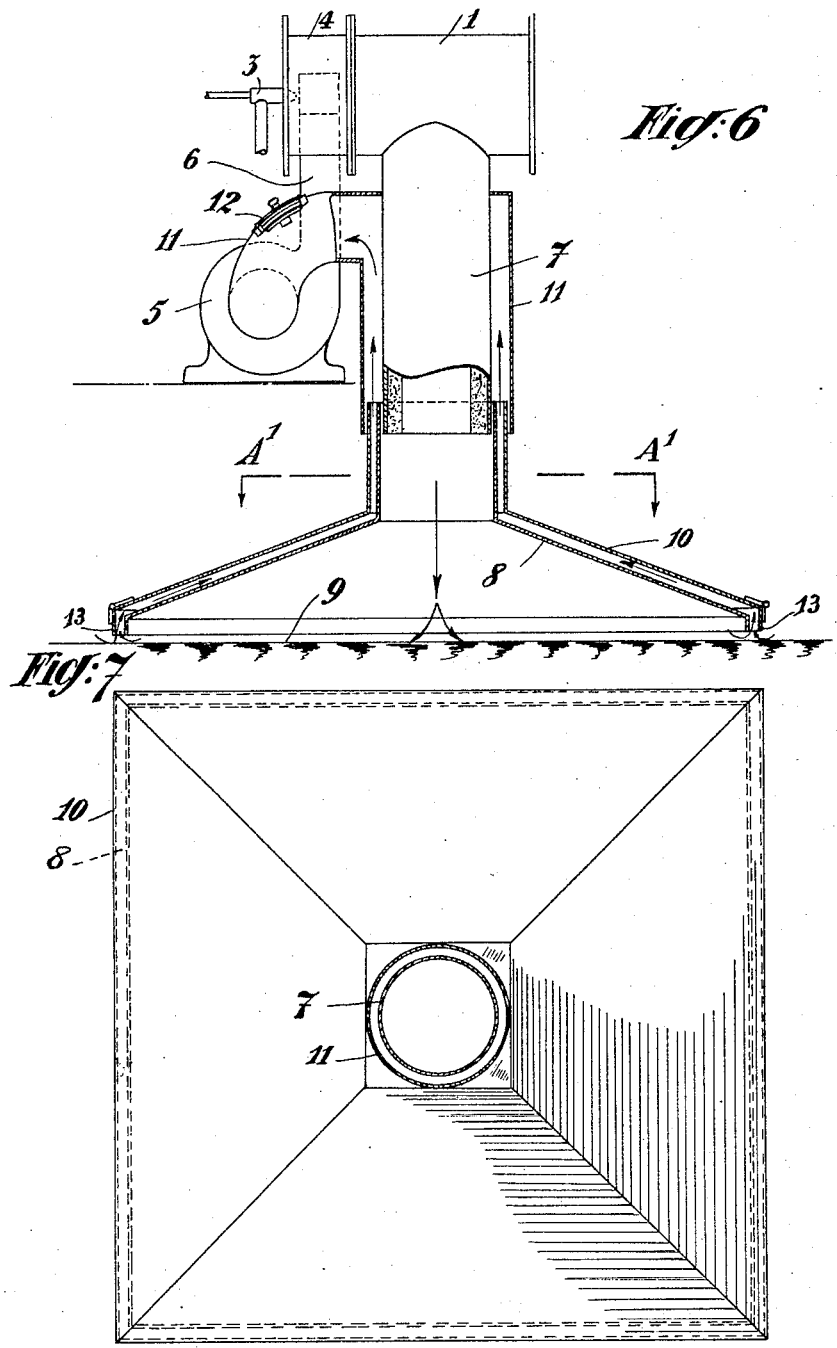

1,899,704

UNITED STATES PATENT OFFICE

GEORGE HINTON LUTZ, OF CHICAGO, ILLINOIS

APPARATUS FOR HEATING SURFACES

Application filed January 28, 1932, Serial No. 589,488, and in France November 23, 1931.

This invention relates to an apparatus for heating surfaces, especially surfaces that are approximately horizontal, such as pavements, which apparatus can be mounted upon any mobile or stationary foundation carrying the said equipment for its operation. This apparatus consists of a furnace or heating chamber, at one end of which is located a means for burning liquid fuel, a fan serving to supply a large volume of air to the furnace, and a heat spreading and heat confining member, such as a hood, whereby the hot gaseous medium is brought into contact with the surface to be heated.

The large volume of air passing through the heating chamber is mixed with the products of combustion passing into said heat confining member or covering member adapted to direct the gaseous heating agent against the surface to be heated.

In apparatus of the type referred to above as heretofore constructed the hot gaseous medium, after impinging upon the surface to be heated, escapes directly to the atmosphere, resulting in a great waste of heat and often causing injury to trees and foliage. These escaping gases also cause damage to the curbs of adjacent sidewalks, which usually are made of material, such as limestone, which contains moisture, and this being expanded by the heat causes fractures of the curbing. Moreover, damage is done by the hot gases to the rubber tires of nearby vehicles, and specially to the tires of the truck by which the apparatus itself is carried.

The main object of this invention is to prevent this waste and injury; and for the accomplishing of that object it provides means whereby the hot gases which escape under the edges of the hood or heat spreading member are returned again to the heating chamber. This salvaged hot air is of such high temperature when returned to the furnace that it requires but a very small amount of fuel to bring it back again to the operating temperature.

When it is desired to heat an object or surface beyond the edge of the hood, then one or more of the adjustable parts of the return conduit may be so moved as to allow the hot air to escape to the atmosphere to heat such object or surface.

If the cycle of operation were prolonged indefinitely without the admission of fresh air the oxygen supporting combustion would be quickly exhausted. Owing to the irregular surfaces usually heated a small amount of the hot air will ordinarily escape to the atmosphere allowing the same amount of fresh air to be admitted to the return conduit. In addition such fresh air as desired may be admitted through a variable opening or valve in the exhaust conduit leading to the fan. To prevent the hood from coming into intimate contact with a surface that might be so true as to prevent escape of the hot gases from the inner hood, there are attached to the hood shoes or runners which prevent such intimate contact.

The invention will be fully understood upon reference to the accompanying drawings in which:

Fig. 1 is an elevation of the apparatus in which are shown the essential parts;

Fig. 2 is a top view of a section on line C—C of Fig. 1;

Fig. 3 is a sectional view of Fig. 1 cut at A—A;

Fig. 4 is a section of Fig. 2 cut at B—B;

Fig. 5 is an end view of Fig. 1;

Fig. 6 shows a different construction of apparatus for accomplishing the same result;

Fig. 7 is a top view of a section on line $A^1$—$A^1$ of Fig. 6.

The apparatus illustrated in the drawings comprises a furnace or heater 1 of any suitable type, having a refractory lining 2; an oil burner 3; and an air-chamber 4.

The necessary air for combustion and heating the surface is supplied by fan 5 and delivered by conduit 6 to chamber 4. The products of combustion and hot air are forced through furnace 1 and conduit 7 into hood 8 onto a pavement or other surface 9.

For the purpose of returning the hot air that would otherwise be discharged into the atmosphere, a secondary hood 10 is fitted to hood 8. By means of the suction of the fan 5 the hot air is drawn from hood 10 through conduit 11. 12 is a variable opening to the atmosphere to permit of the addition of fresh air.

This outer conduit or hood 10 may be provided at 13 with movable shutters to allow the hot air to blow beyond the confines of the hood when desired. Shoes or runners 14 are provided to prevent a too close contact of the hood with the surface to be heated.

In the embodiment of the invention illustrated in Figs. 6 and 7 the two hoods 8 and 10 are concentric and there is a space between them which serves as a passageway for the return of the gases to the furnace. Flue 11 is likewise concentrically disposed with respect to flue 7.

It is obvious that any changes in the details of construction will not alter the principles of the operation of this invention.

Having thus described my invention what I claim as new therein, and desire to secure by Letters patent is:

1. An apparatus for heating surfaces comprising in combination, a chamber, means for forcing air into said chamber at one end thereof, fuel burning means located in said chamber, a heat spreading and confining member for covering the surface to be heated, a conduit for connecting said hood with the other end of said chamber, and means located adjacent said hood for catching the used hot gases which pass the edges of said heat spreading member and returning them back again to said chamber.

2. An apparatus for heating surfaces comprising in combination, a chamber, a fan for forcing air into said chamber at one end thereof, a fuel burner located in said chamber, a hood for covering the surface to be heated, a conduit for connecting said hood with the other end of said chamber, a second hood located adjacent the first mentioned one, and a conduit for connecting said second hood with the inlet of said fan for returning the used hot gases back again to said chamber.

3. An apparatus according to claim 1 further comprising means for admitting fresh air into said secondary conduit.

4. An apparatus according to claim 2 further comprising means for admitting fresh air into the second mentioned conduit.

5. An apparatus according to claim 2 in which the second mentioned hood surrounds the first mentioned one.

6. An apparatus according to claim 2 in which the second mentioned hood surrounds the first mentioned one, and the second mentioned conduit is concentrically disposed around the first mentioned one.

7. An apparatus for heating surfaces, comprising means for supplying a heated gaseous medium, a heat spreading and confining member adapted to discharge said gaseous medium against the surface to be heated, and means for catching the gaseous medium escaping around the edge of said member and conducting it back to said supplying means.

8. An apparatus for heating surfaces, comprising means for supplying a heated gaseous medium, a hood for spreading said gaseous medium over and against the surface to be heated and means for catching the gaseous medium escaping around the edge of said hood and conducting it back to said supplying means.

9. An apparatus for heating surfaces, comprising means for supplying a heated gaseous medium, a hood for spreading said gaseous medium over and against the surface to be heated and a second hood so disposed as to catch the gaseous medium escaping around the edge of said first named hood and to conduct it back to said supplying means.

In testimony whereof I have signed this specification.

GEORGE HINTON LUTZ.